Patented Aug. 7, 1951

2,563,091

UNITED STATES PATENT OFFICE 2,563,091

DYES

John Wright, Spondon, near Derby, England, assignor, by mesne assignments, to Celanese Corporation of America, a corporation of Delaware No Drawing. Application June 25, 1942, Serial No. 448,441. In Great Britain July 22, 1941

12 Claims. (Cl. 260—187)

This invention relates to improvements in the manufacture of dyes and in the colouration therewith of textile and other materials, and particularly of materials containing fibres of cellulose ethers or cellulose esters of organic carboxylic acids.

The invention is concerned with new disazo dyes which yield valuable colourations on textile and other materials of cellulose esters or ethers. These new disazo dyes are of the general formula R—N=N—R₂—N=N—R₃OX, wherein X is hydrogen or alkyl, wherein each of $R_1, R_2$, and $R_3$ is an aryl radicle of which the aryl nucleus is a single benzene nucleus, and wherein at least one of the radicles $R_1$, $R_2$, and $R_3$ carries an acidylamino group as a substituent.

The invention includes the manufacture of these dyes, compositions containing these dyes together with dispersing agents and/or protective colloids, processes for the colouration of cellulose ester and ether textile and other materials by the application thereto of the said dyes, and materials coloured with the said dyes.

As regards the acidyl radicle present in the acidylamino group, this is preferably acetyl or the radicle of another fatty acid containing less than five carbon atoms. However, the acidyl radicle may be of a different type, for example, the acidyl radicle of a benzene carboxylic acid, for example the benzoyl group or the p-chlorbenzoyl group. The acidylamino group may be either an acidyl primary amino group, e. g. acetylamino, or an acidyl secondary amino group, e. g. acetyl-methylamino. Examples of other substituents which can be present in the aromatic nuclei are alkyl (including the oxyalkyl group), chlorine or other halogen atoms, and methoxy or other alkoxy groups, the last mentioned being additional to the group —OX. Nitro groups, non-acidylated amino groups, and hydroxyl groups are preferably absent. Sulphonic and carboxylic groups should also be absent.

The dyes of the invention in general yield on cellulose ester or ether textiles yellow to orange shades which are of very good fastness to light and aqueous treatments, are of good dischargeability, and are resistant to steaming. Good dyeing properties are also possessed by the analogous dyes free from acidylamino groups, e. g. benzeneazo-benzene-azophenol, but the dyes of the present invention are better in respect of colour yield and fastness to alkaline treatments and to steaming than the dyes differing in constitution only by the absence of the acidylamino group. Most valuable from the point of view of fastness to aqueous alkaline treatments and to other aqueous treatments are the dyes in which the phenolic hydroxyl group is in the ortho position to an azo group or the dyes in which the phenolic hydroxyl group is etherified.

According to one feature of the invention the new disazo dyes of the above mentioned general formula in which X is hydrogen are manufactured by coupling the appropriate diazotised amino-azo compound with the appropriate phenol, that is by coupling a diazotised amino-azo compound of the general formula

$R_1$—N=N—$R_2$—NH$_2$ with a phenol of the formula R₃OH, wherein $R_1$, $R_2$, and $R_3$ have the meanings already indicated. In this method of preparation, of course, either the amino-azo compound or the phenol coupling component, or each of them, must contain an acidylamino group. The most useful products are those derived from an amino-azo compound containing an acidylamino group. When dyes containing the hydroxy group ortho to the azo group are to be made in this way, the para position to the hydroxyl group in the coupling component must be blocked. For example, the amino-azo compound obtainable by coupling diazotised p-acetylamino-aniline with p-xylidine can be diazotised and coupled with p-cresol.

Further examples of amino-azo compounds which can be used in this method of preparation are the 4-amino-azo-benzenes which can be obtainable by coupling diazotised aniline, chloranilines, toluidines, xylidines, anisidines, cresidine, m-acetylamino-aniline or p-acetylamino-aniline with aniline, 2:5-dimethoxy-aniline, 2:5-di-oxy-ethoxy-aniline, o- or m-chloranilines, o- or m-toluidines, o- or m-anisidines, cresidine (3-methyl - 6 - methoxy-aniline), m-acetylamino-aniline, m-propionyl-amino-aniline, or p-xylidine. Primary amines which do not couple readily with diazo compounds in para positon to the amino group, e. g. aniline or o-toluidine are best used as coupling components, in the formation of the amino-azo compounds, in the form of their formaldehyde bisulphite compounds. The free amino-azo compound can then be readily liberated by hydrolysis. To form the dyes of the invention any one of these amino-azo compounds can then be diazotised and coupled with, for example, phenol, cresols, xylenols, chlorphenols, or acetylamino-phenols, provided that either the amino-azo compound, or the phenolic coupling component, or each of them, contains an acidyl-amino group.

According to a further feature of the invention, the dyes of the above general formula in which X is hydrogen, that is the dyes containing the free phenolic hydroxyl group are prepared by acidylating the free amino group in the corresponding appropriate hydroxy-amino-disazo dye. Simultaneous acidylation of the hydroxy group can be substantially avoided by appropriate choice of reaction conditions, e. g. by treatment with the appropriate acid anhydride or the anhydrous acid in the cold or for a short time only at higher temperatures or by using a limited amount of the acidylating agent. For example, the azo compound can be treated in the cold or warmed gently for a short time with acetic anhydride or can be shaken with dilute caustic soda and acetic anhydride. In this way the disazo compound obtainable by coupling diazotised p-aminophenol with p-xylidine and re-diazotising and coupling with m-toluidine can be acetylated to give a disazo dye in accordance with the invention.

Those dyes of the invention in which X is an alkyl group can be prepared in accordance with the invention by etherification of the corresponding dyes in which X is hydrogen, that is by etherification of the corresponding dyes containing phenolic hydroxyl groups. The etherification can be carried out, for example, by means of alkyl halides, e. g. ethyl chloride, or di-alkyl sulphates, e. g. diethylsulphate, preferably in presence of alkali. Thus a phenolic disazo dye can be prepared by diazotising p-acetylaminoaniline, coupling with p-xylidine, and re-diazotising and coupling with ortho-cresol, and this phenolic dye ethylated by grinding with caustic soda so as to form a sodium salt, adding diethyl sulphate, and warming to about 50° C.

Again, the disazo dyes of the invention in which X is an alkyl group can be obtained by acidylation of the free amino group of an appropriate etherified hydroxy-amino-disazo dye. For example, such an etherified dye can be obtained in accordance with the invention by warming with acetic anhydride the disazo dye obtainable by coupling diazotised p-phenetidine with m-toluidine and re-diazotising and coupling with p-xylidine.

The new dyes can be applied to cellulose ester or ether materials in the form of aqueous dispersions or solutions in organic solvents. Bath methods may be employed, that is to say methods in which the materials are allowed to absorb the dye from a dispersion or solution of the latter in which they are immersed. When dyeing from an aqueous dispersion it is preferred to use a temperature of 75–85° C. Again mechanical impragnation methods may be used, the materials being impregnated with a solution or suspension of the requisite amount of the dye. To this end padding or printing methods may be utilised. The mechanically impregnated material may then be aged or steamed to cause the dye to enter the cellulose ester or ether material.

The dyes of the present invention have substantive affinity for cellulose ester or ethers, but in general substantially no affinity for cellulose or animal fibres. If, therefore, such a dye is applied to mixed materials containing both cellulose, e. g. cotton or regenerated cellulose, and a cellulose ester or ether, the latter alone takes up the dye and the cellulose component of the material remains uncoloured. By suitably colouring the cellulose component of such mixed material with dyestuffs resisting the cellulose ester or ether component of the materials, solid shades or two colour effects can readily be obtained according to the components and dyes selected. The dyestuffs for the cellulose portion can be applied before or after the application of the dye for the cellulose ester or ether portion.

The new dyes are also of value for colouring cellulose ester or ether solutions, especially lacquers and spinning solutions. By shaping and setting such solutions in the form of filaments, straws, films and the like, valuable coloured products can be produced. For example, coloured cellulose acetate filaments can be produced by dry spinning such coloured solutions.

The invention, so far as it relates to the colouration of materials, is particularly concerned with the production of coloured cellulose acetate products. The new dyes, may however, also be used for the production of coloured products of other cellulose esters, for example cellulose formate, propionate, butyrate or acetate-butyrate, or of cellulose ethers, for example methyl, ethyl or benzyl cellulose. Further, the new dyes can be used for the colouration of materials formed from synthetic linear polymers, e. g., superpolyamide textile materials, for instance the superpolymer obtainable from adipic acid and hexamethylene diamine.

The invention is illustrated by the following examples:

*Example I*

150 parts of p-acetylamino-aniline are stirred until dissolved in 2000 parts of water to which 250 parts of hydrochloric acid (32° Tw.) has been added. The solution is cooled to 5° C. with ice and sodium nitrite (about 70 parts) as an aqueous solution is run in slowly till a faint permanent excess of nitrous acid shows on starch-iodide paper. The diazo solution is then run into a solution of 107 parts m-toluidine in the form of its formaldehyde-bisulphite compound, coupling being effected in presence of sodium acetate. When coupling is complete the product is made neutral with caustic soda and then sufficient caustic soda is added to make a 5% solution and the whole is stirred over-night to hydrolyse off the formaldehyde-bisulphite group. Next day the amino-monoazo compound (4-acetylamino-4'-amino-2'-methyl-azo-benzene) is filtered off and stirred into 4000 parts of water and 250 parts of hydrochloric acid (32 Tw.), warmed to 25–30° C., an aqueous solution of 70 parts of sodium nitrite added, and stirring continued till diazotisation is complete. The resulting diazo solution is then run into a solution of 94 parts of phenol and 40 parts of caustic soda in 6000 parts of water, sodium carbonate being added so as to maintain the reaction alkaline to brilliant yellow paper. The resulting dyestuff is filtered off, washed, and either mixed with a dispersing agent and dried and ground, or milled with water to give a paste. It dyes cellulose acetate a clear golden yellow.

*Example II*

150 parts of p-acetylamino-aniline are diazotised as in Example I and the diazo solution run with stirring into a solution of 121 parts of p-xylidine in 4000 parts of water and 116 parts of hydrochloric acid (32° Tw.). Sufficient sodium acetate is now added to neutralise the hydrochloric acid and stirring continued until coupling is complete. In this way 4-acetylamino-4'-amino-2':5'-dimethyl-azo benzene is formed. The whole is then made just acid to Congo red paper with hydrochloric acid, a further 250 parts of hydrochloric acid added, and warmed to 30° C. An aqueous solution of sodium nitrite is then added till diazotisation is complete and a slight excess of nitrous acid is maintained. About 70 parts of sodium nitrite is required. The diazo solution is then run into a solution of 108 parts of p-cresol in 2000 parts of water and 40 parts of caustic soda, at the same time adding sodium carbonate to maintain an alkaline reaction to brilliant yellow paper. The resulting dyestuff is filtered off, washed, and either mixed with a dispersing agent and dried and ground, or milled with water to give a paste. It gives a golden orange shade on cellulose acetate.

The following dyes may be obtained similarly:

(1) A golden yellow dye by coupling diazotised p-propionyl-amino-aniline with aniline and re-diazotising and coupling with phenol.

(2) An orange dye by coupling diazotised 4-acetylamino-2-methoxyaniline with m-toluidine and re-diazotising and coupling with p-cresol.

(3) A yellow dye by coupling diazotised p-benzoylamino-aniline with m-toluidine and re-diazotising and coupling with phenol.

*Example III*

109 parts of p-aminophenol are stirred into 2000 parts of water and 250 parts of hydrochloric acid, and ice is added to reduce the temperature to 5° C. An aqueous solution of sodium nitrite (about 70 parts) is added till a small excess of nitrous acid is shown on starch-iodide paper. The solution is now run into a solution of 121 parts of p-xylidine in 4000 parts of water and 116 parts of hydrochloric acid (32° Tw.). Sufficient sodium acetate is added to render the liquid neutral to Congo red paper and the liquid is stirred till coupling is complete. The amino-monoazo compound is now filtered off and stirred into 3000 parts of water and 300 parts of hydrochloric acid. This is now warmed to 30° C., and diazotised by the addition of an aqueous solution of sodium nitrite. When diazotisation is complete the solution is run into a solution containing 107 parts of m-toluidine as the formaldehyde-bisulphite compound, sodium acetate being added to neutralise the hydrochloric acid. Stirring is continued till coupling is complete and sufficient caustic soda is added to give a 5% concentration. Scission of the formaldehyde-bisulphite compound is then effected by warming to 60° C. and stirring overnight. The disazo compound is then filtered off, dried, and dissolved in 1000 parts of acetic acid. 102 parts of acetic anhydride are now added and the whole is warmed to 100° C. The acetylation mixture is now poured into 10,000 parts of water and the dye filtered off, washed, and either mixed with a dispersing agent and dried and ground, or milled with water to give a paste. It gives a deep orange shade on cellulose acetate.

*Example IV*

1 kilogram of the 10% aqueous paste of the dye described in Example II is diluted with 10 litres of 2.5 g. p. l. soap solution at 60–80° C. The dispersion thus formed is filtered through a filter cloth or sieve into a winch dyeing machine containing 3000 litres of soft water set with 0.25 g. p. l. soap. 100 kilograms of a cellulose acetate fabric are then entered, and the temperature raised slowly to 80° C., at which temperature it is maintained for about 1 hour 30 minutes. The goods are then rinsed, dried, and finished as desired. A golden orange shade is obtained.

Having described my invention what I desire to secure by Letters Patent is:

1. An azo dye selected from the group consisting of azo dyes of the formula

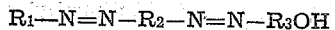

wherein $R_1$, $R_2$ and $R_3$ are benzene nuclei of which at least one carries an acidylamino-group as a substituent and substitution products of the azo dyes of the said formula wherein the additional substituents are selected from the group consisting of halogen, alkyl and alkoxy, the azo groups of said dye being attached to para-positions of the nucleus $R_2$ and the acidylamino group being one of which the acidyl radicle is selected from the group consisting of acidyl radicles of fatty acids containing less than five carbon atoms and acidyl radicles of benzene carboxylic acids.

2. An azo dye selected from the group consisting of azo dyes of the formula

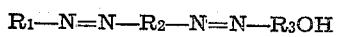

wherein $R_1$, $R_2$ and $R_3$ are benzene nuclei of which the radicle $R_1$ carries an acidylamino-group as a substituent and substitution products of the azo dyes of the said formula wherein the additional substituents are selected from the group consisting of halogen, alkyl and alkoxy, the azo groups of said dye being attached to para-positions of the nucleus $R_2$ and the acidylamino group being one of which the acidyl radicle is selected from the group consisting of acidyl radicles of fatty acids containing less than five carbon atoms and acidyl radicles of benzene carboxylic acids.

3. An azo dye according to claim 1, wherein —$R_3$—OH is the residue of a coupled cresol.

4. An azo dye according to claim 2, wherein —$R_3$—OH is the residue of a coupled cresol.

5. The azo dye of the formula

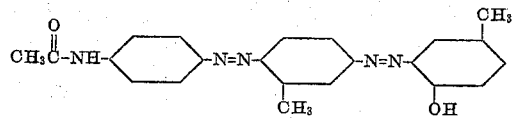

6. The azo dye of the formula

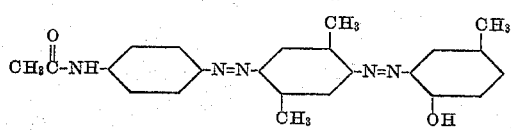

7. The azo dye of the formula

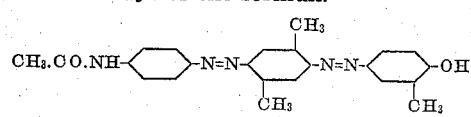

8. The disazo dye of the formula:

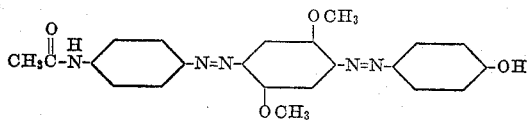

9. The disazo dye of the formula:

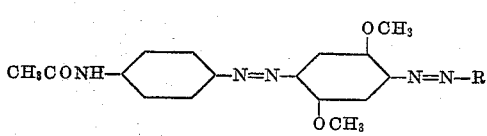

wherein R is a coupled cresol containing no further substituents.

10. Process for the production of a new azo dye, which comprises coupling diazotised 4- acetylamino - 4' - amino-2'-methyl-azo-benzene with p-cresol.

11. Process for the production of a new azo dye, which comprises coupling diazotised 4-acetylamino-4'-amino-2':5'-dimethyl-azo - benzene with p-cresol.

12. Process for the production of a new azo dye, which comprises coupling diazotised 4-acetylamino-4'-amino-2':5'-dimethyl-azo - benzene with o-cresol.

JOHN WRIGHT.

REFERENCES CITED

The following references are of record in the file of this patent:

UNITED STATES PATENTS

| Number | Name | Date |
|---|---|---|
| 2,030,991 | Jordan | Feb. 18, 1936 |
| 2,072,252 | Ellis | Mar. 2, 1937 |
| 2,127,986 | Roos | Aug. 23, 1938 |
| 2,192,153 | Roos | Feb. 27, 1940 |
| 2,289,414 | Ellis et al. | July 14, 1942 |